United States Patent [19]

Schmidt

[11] Patent Number: 5,066,940
[45] Date of Patent: Nov. 19, 1991

[54] BRAKE PEDAL TRAVEL WARNING SYSTEM

[75] Inventor: Norman G. Schmidt, Toledo, Ohio

[73] Assignee: Ford Motor Company, Dearborn, Mich.

[21] Appl. No.: 596,649

[22] Filed: Oct. 10, 1990

[51] Int. Cl.$^5$ ............................................. B60Q 1/00
[52] U.S. Cl. ................................ 340/453; 340/450.1; 60/534; 60/535; 60/545
[58] Field of Search .................. 340/450.1, 452, 453, 340/454; 188/1.11; 60/534, 535, 545, 561, 562

[56] References Cited

U.S. PATENT DOCUMENTS

| 3,564,175 | 2/1971 | Cooper . | |
| 3,611,220 | 10/1971 | Hoffman . | |
| 3,697,942 | 10/1972 | Hocking et al. | 340/450.1 |
| 4,077,217 | 3/1978 | Leiber | 340/452 |
| 4,084,377 | 4/1978 | Gaiser | 340/452 |
| 4,318,091 | 3/1982 | Fulmer | 340/452 |
| 4,604,866 | 8/1986 | Gaiser | 60/545 X |
| 5,016,442 | 5/1991 | Zander et al. | 60/545 X |

Primary Examiner—Donnie L. Crosland
Assistant Examiner—Jeffery A. Hofsass
Attorney, Agent, or Firm—Raymond L. Coppiellie; Roger L. May

[57] ABSTRACT

A brake pedal travel warning system for use in an automotive vehicle includes a brake pedal and a master cylinder associated with the brake pedal through a connecting link. The master cylinder includes a fluid reservoir containing brake fluid and a housing including an internal bore communicating with the fluid reservoir through a reservoir port, the bore defining a primary chamber and a second chamber. A primary piston is slidably disposed in a primary chamber and reciprocally moves therein. A secondary piston is slidably disposed in the secondary chamber. The master cylinder further includes a signal generation means associated with the primary piston for generating a warning signal in response to excessive piston travel in the primary chamber. In one embodiment, the signal generation means comprises a magnetic member disposed on the end of the primary piston which excites a reed switch assembly disposed externally of the housing after the primary piston has exceeded the predetermined travel distance within its primary chamber.

17 Claims, 2 Drawing Sheets

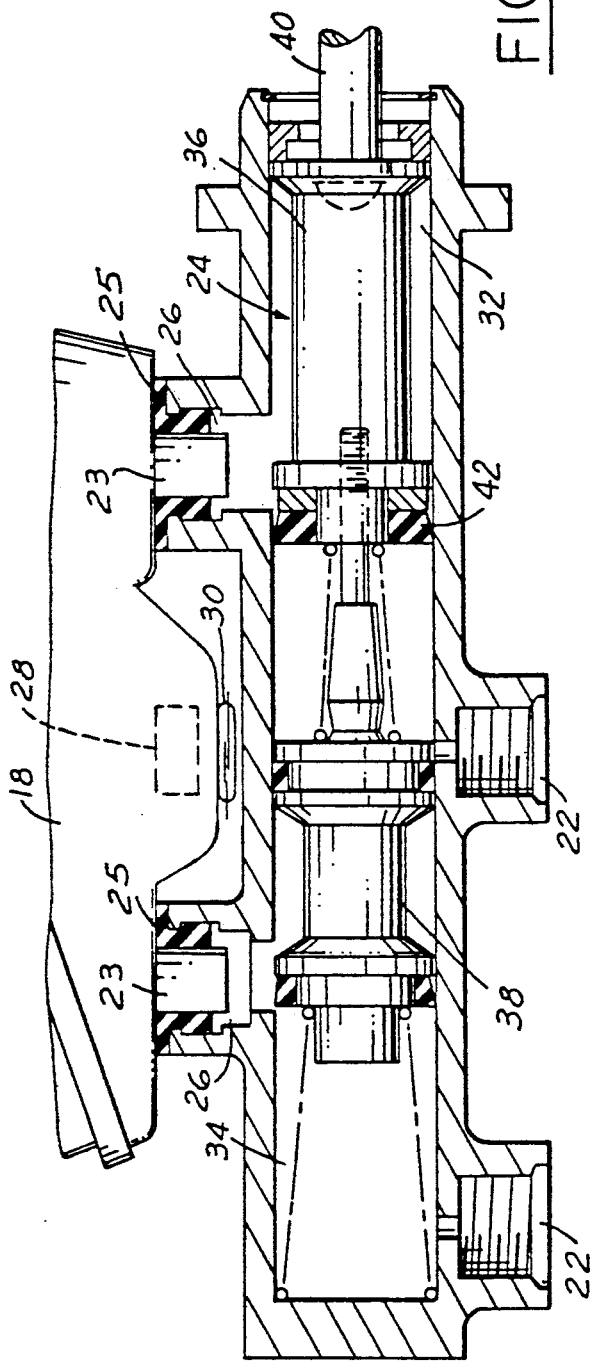
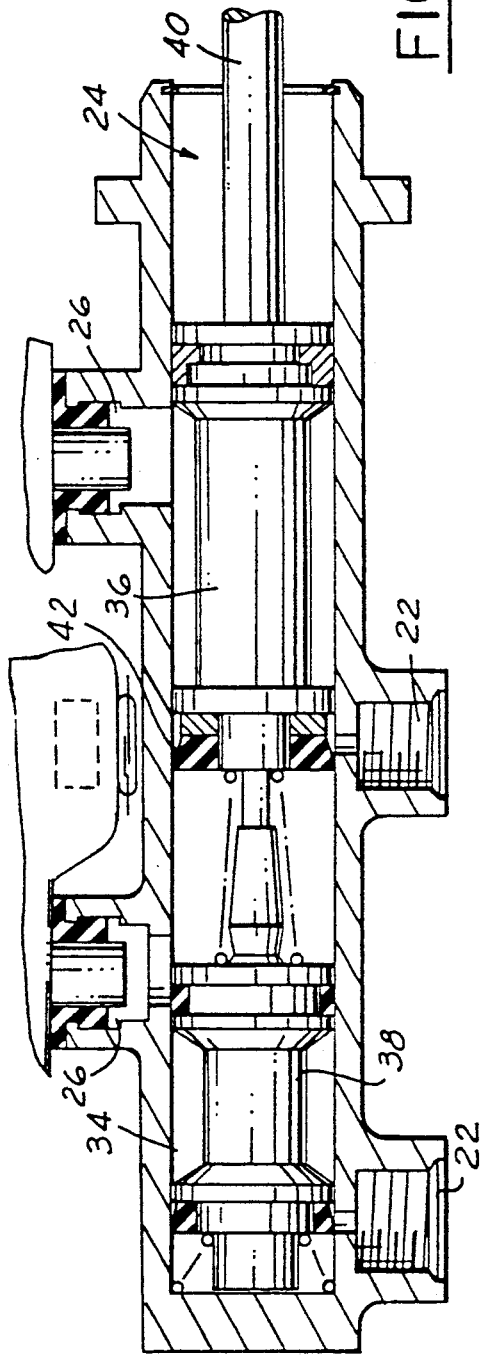

BRAKE PEDAL TRAVEL WARNING SYSTEM

BACKGROUND OF THE INVENTION

1. Field of the Invention

The present invention relates generally to a warning system for use in automotive vehicles More particularly, the present inventions relates to a brake master cylinder assembly having a warning signal system for producing a signal in response to excessive brake pedal travel.

2. Description of the Related Art

In typical automotive braking systems, a brake pedal is connected to a hydraulic master cylinder through a connecting linkage. When the vehicle operator depresses the brake pedal, an actuator rod contacts a piston disposed within the master cylinder. The piston forces hydraulic brake fluid contained in the braking system under pressure. The pressure is transmitted through a rigid tubing and flexible lines to each wheel of the vehicle to effect braking at each wheel.

In recent years, most vehicles have utilized a dual master cylinder having two cylinder reservoirs contained within a brake master cylinder assembly Each of the cylinders operates independently through separate brake lines, one actuating the front brakes and the other actuating the rear brakes. Also, it is known to utilize one cylinder to actuate the right front, left rear brakes while the second cylinder operates the left front, right rear brakes. These independent braking operations function as a safety feature in that should one system fail, the other system operates to effect the braking of the vehicle. If there is a failure in one of these systems, possibly due to a leak in one of the hydraulic pressure lines, the brake pedal will be depressed beyond a predetermined distance. The increased pedal travel required to compensate for the loss of the failed portion of the brake system may give warning that a partial brake failure has occurred in that the operator of the vehicle may notice a different "feel" to the brake pedal. However, this feel by the vehicle operator is an unreliable indication of brake failure, since increased pedal travel may be due to variables other than a failure in the hydraulic system of one of the brake systems.

For example, increased pedal travel may be due to a condition known as brake fade. Brake fade may occur when the brakes become overheated during multiple, extensive applications of the brakes such as during panic stops from freeway speeds in heavy traffic or braking down a long hill while pulling a trailer. When the brakes become overheated, the brake linings become compressible, or "spongy", and lose their ability to effect stopping of the wheel. The vehicle operator must push continuously harder on the brake pedal to compensate for the compressibility of the linings, thus forcing the piston in the master cylinder beyond its predetermined travel limit. In the absence of a warning device indicating to the vehicle operator that the brake system integrity has been breached, the driver relies solely upon the "feel" of the brakes to determine a possible problem.

One known method for warning the vehicle operator of a failure of one of the brake systems due to a leakage of the hydraulic fluid in one of the lines is by the use of a pressure differential valve. The valve generates a warning signal, received by the vehicle operator, whenever one of the brake systems has a pressure drop. However, the pressure differential valve only acts in response to a pressure drop and not to brake fade.

Other fluid pressure responsive devices have been proposed for generating a signal in response to pressure changes within a housing. For example, U.S. Pat. No. 3,611,220 discloses a fluid pressure responsive device having two magnets with like poles facing each other. A first magnet is mounted with a piston to be movable toward the second magnet in response to fluid pressure, causing the second magnet to repel and, consequently, exciting a magnetic responsive monitor. The system utilizes two magnets and relies upon the repulsion of the magnets to effect a warning. The system may not be suitable for use in the confines of a master cylinder assembly. Also, the presence of two magnets may interfere with the operation of the master cylinder, resulting in failure of the brake system. The '220 system responds to pressure changes on opposite sides of a filter and does not teach or suggest the use of such system in a brake master cylinder assembly.

U.S. Pat. No. 3,564,175 discloses a magnetic pressure responsive switch for use with a filtering mechanism, the switch having a magnetic piston movable towards a partition in a housing in response to a predetermined pressure differential between two passages. An electrical switch is mounted on the opposite side of the partition and is actuated by the magnetic piston as a pressure differential draws the piston towards the partition. The '175 patent fails to teach or suggest the use of such system in a brake master cylinder assembly and such a system would give no indication of excessive brake pedal travel due to brake fade since the '175 system requires a pressure differential to move the piston.

The present system provides a means of warning a vehicle operator of excessive brake pedal travel due to brake system failure, brake fade or hydraulic brakeline failure by providing a master cylinder assembly having a magnetic member disposed on a piston within the master cylinder chamber. The magnetic member actuates a magnetic responsive switch as the piston moves beyond a predetermined distance within the master cylinder.

It is a feature of the present invention to provide a master cylinder assembly which warns the vehicle driver of either a low brake fluid level or excessive brake pedal travel by an inexpensive and reliable system utilizing a magnetic responsive switch, a piston having a magnetic member within the housing of the master cylinder and a float assembly in the master cylinder reservoir.

It is an object of the present invention to provide a brake pedal travel warning system which generates a warning signal to the vehicle operator without relying on unreliable "feel" of the brake pedal by the operator.

It is an advantage of the present invention to provide a brake pedal travel warning system which is economical to produce and reliable in service with a minimum of moving components.

SUMMARY OF THE INVENTION

There is disclosed and claimed herein a brake pedal travel warning system for use in an automotive vehicle comprising a brake pedal and a master cylinder operatively associated with the brake pedal through a connecting link. The master cylinder includes a fluid reservoir containing brake fluid, a housing including an internal bore communicating with the fluid reservoir through a reservoir port, the bore defining a chamber.

An actuator rod extends from the housing and engages the connecting link. The housing further includes a piston slidably disposed in the chamber as well as a signal generation means associated with the piston for generating a signal in response to excessive piston travel in the chamber.

The signal generation means comprises a magnetic member disposed on the piston and a magnetic field responsive switch member for generating a signal in response to the presence of a magnetic field. In one embodiment, the magnetic member is a magnet affixed to one end of the piston and the magnetic field responsive switch member is a magnetic reed switch. The signal generation means may also include a float disposed in the reservoir, the float containing magnetic material operative to excite the magnetic reed switch when the fluid level reaches a predetermined level in the reservoir. The magnetic reed switch is electrically connected to a warning signal device disposed in the vehicle.

In an alternative embodiment, a brake pedal travel warning system for use in an automotive vehicle as generally described above is disclosed for use with a dual master cylinder assembly wherein the master cylinder includes a housing defining a primary chamber and a secondary chamber and having a primary piston and a secondary piston disposed in the respective chambers. The signal generation means includes a magnetic member disposed on the primary piston so that a warning signal is generated after the primary piston has traveled a predetermined distance in the primary chamber.

These and other advantages of the present invention will become apparent from the drawings, description and claims which follow.

BRIEF DESCRIPTION OF THE DRAWINGS

Reference will now be made to the following drawings in which:

FIG. 3 is a cross-sectional view of the master cylinder assembly of FIG. 1; and

FIG. 4 is a cross-sectional view of the master cylinder assembly of FIG. 1 in the actuated state.

DETAILED DESCRIPTION OF THE PREFERRED EMBODIMENT

Figure 1:
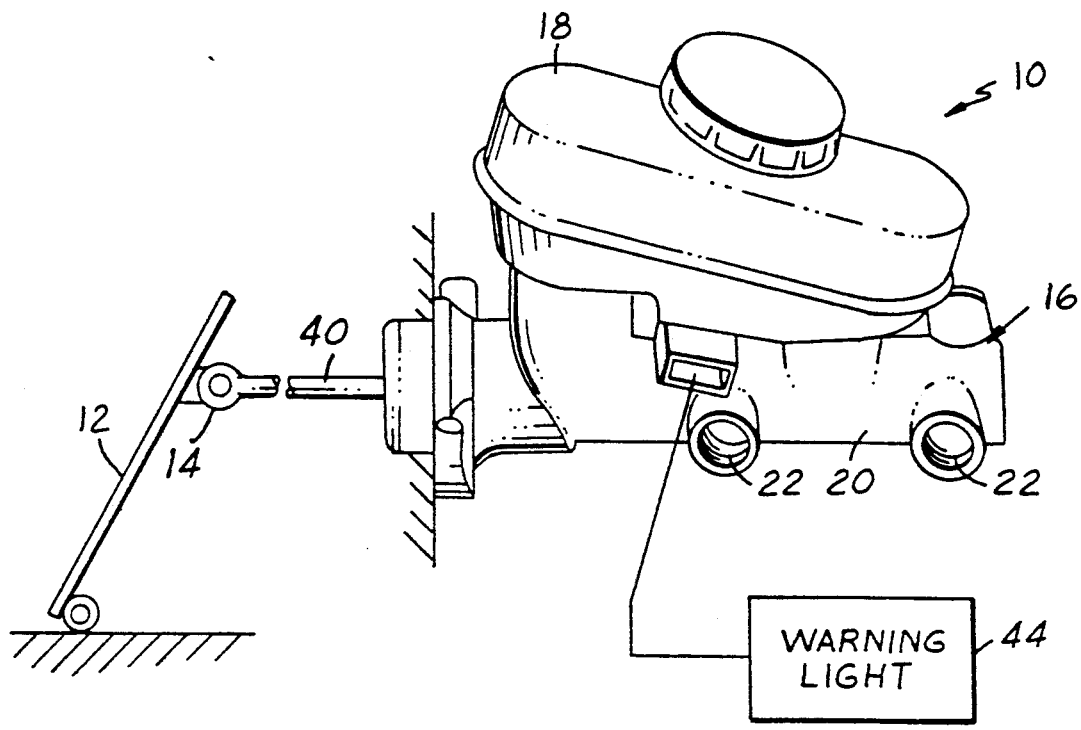
FIG. 1 is a perspective view of a brake pedal travel warning system structured in accord with the principles of the present invention.
Figure 2:
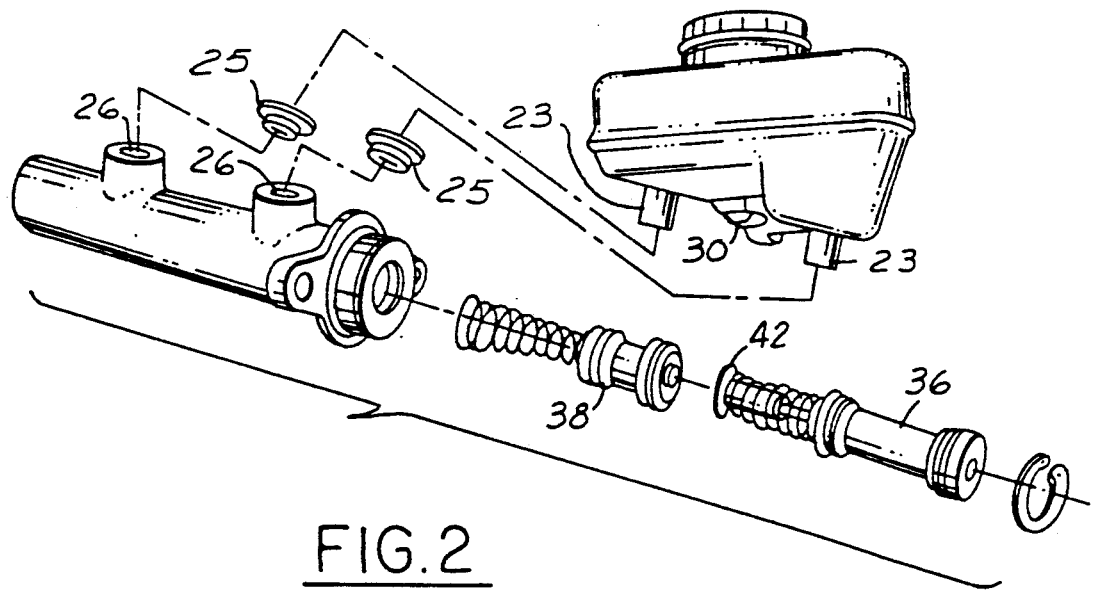
FIG. 2 is an exploded view of a master cylinder assembly of the present invention.

Referring now to the drawings, and more particularly to FIG. 1, a brake pedal warning system 10 of the present invention includes a brake pedal 12 connected to a master cylinder assembly 16 through a connecting link 14. The master cylinder assembly 16 includes a master cylinder housing 20 and a fluid reservoir 18 containing brake fluid. The housing 20 communicates with reservoir 18 through reservoir ports 23 integral with reservoir 18 which matingly engage apertures 26 in housing 20. A pair of bushings 25 surround ports 23 and prevent fluid leakage around ports 23 as shown in FIGS. 2 and 3. The master cylinder housing also includes exit ports 22 through which hydraulic fluid passes by means of tubing to the brakes. The present invention is being described with respect to a dual master cylinder assembly although it should be apparent to one of skill in the art that the present system may be utilized with a master cylinder having a single chamber disposed within the master cylinder housing. Typically, master cylinder housing 20 is manufactured from a nonmagnetic material such as aluminum, in a die casting operation. Fluid reservoir 18 typically is manufactured from an elastomeric polymeric material.

As seen in FIG. 3, reservoir 18 further includes a float 28 having magnetic material therein disposed in the brake fluid within reservoir 18. When the brake fluid within reservoir 18 falls below a predetermined level, float 28 excites a magnetic field responsive switch, such as a reed switch 30 disposed externally of reservoir 18. In the embodiment shown in FIGS. 2 and 3, the reed switch 30 is disposed in an area defined between reservoir 18 and master cylinder housing 20. The reed switch 30 is electrically connected to a fluid indicating warning device located within the vehicle to warn the vehicle operator of low brake fluid level. Such a warning system is well known to those of skill in the art as shown in U.S. Pat. No. 3,947,813. It also should be apparent to those skilled in the art that other types of fluid indicating devices are available and the use of a magnetic float and a reed switch assembly is meant only as an example of one type of fluid indicating device.

Master cylinder housing 20 further includes a bore 24 defining a primary chamber 32 and secondary chamber 34 therein. The primary chamber is disposed at the end of the housing nearest the firewall of the vehicle. The secondary chamber is aligned axially with the primary chamber as can readily be seen in FIG. 3. The master cylinder assembly 16 further includes a primary piston 36 disposed in primary chamber 32 and a secondary piston 38 axially aligned with the primary piston and disposed in secondary chamber 34. As the brake pedal 12 is depressed, connecting link 14 engages an actuator rod 40 which in turn engages the primary piston 36. Upon exertion of the brake pedal 12, both the primary and secondary piston assemblies 36 and 38 move simultaneously, forcing brake fluid under pressure through exit ports 22 to fulfill the braking requirements as needed.

As shown in FIGS. 2 and 3, the primary piston 36 includes a magnetic member 42 disposed at one end thereof. In the preferred embodiment, the magnetic member is a magnet circumferentially disposed around primary piston 36 and securely affixed to the end adjacent the secondary piston assembly. However, it should be apparent to one of skill in the art that the magnetic member 42 may be disposed anywhere on the length of the primary piston 36.

As primary piston 36 is forced within the primary chamber 32, the magnet 42 disposed on piston 36 also travels within the primary chamber. The magnetic member 42 excites reed switch 30 when the magnetic member 42 nears the reed switch 30. Under normal operating conditions, the magnet is disposed on primary piston 36 so that under normal braking pressures and normal brake pedal travel, the primary piston does not travel within the primary chamber far enough for the magnet 42 to excite the reed switch 30. However, in the circumstance of a hydraulic line failure or in a brake fade situation, piston 36 will be forced into chamber 32 a distance exceeding the normal distance so that the magnet 42 approaches the reed switch assembly 30 as can be seen in FIG. 4.

FIG. 4 shows a cross sectional view of the brake master cylinder assembly of FIG. 2 wherein the primary piston 36 has exceeded a predetermined distance within the primary chamber 32 so that the magnet 42 excites the reed switch assembly 30 generating a warning signal received by a warning device 44 (FIG. 1) within the vehicle. In this manner, it is possible to include a warning device for excessive brake pedal travel by using an existing reed switch assembly in conjunction with the fluid level indicating device thereby providing an economical brake warning system. The vehicle operator has a positive indication of excessive brake pedal travel other than relying solely upon the feel of the brake pedal.

It should be apparent to those skilled in the art that many variations and permutations of the present invention are contemplated within the scope of the invention. For example, the magnetic member may be disposed upon the secondary piston assembly and the reed switch assembly positioned such that a brake pedal travel warning device is actuated in response to the secondary piston exceeding a predetermined distance within its respective chamber of the master cylinder housing. Furthermore, the pistons themselves may be formed directly from a magnetic material operative to activate or excite the reed switch assembly. Other magnetic field responsive monitors are available which generate a signal under the imposition of a magnetic field. The following claims, including all equivalents, define the scope of the present invention.

What is claimed is:

1. A brake pedal travel warning system for use in an automotive vehicle, comprising:
   a brake pedal;
   a master cylinder operatively associated with said brake pedal through a connecting link, said master cylinder including:
   a fluid reservoir containing fluid;
   a housing including an internal bore communicating with said fluid reservoir through a reservoir port, said bore defining a chamber therein;
   an actuator rod extending from said housing and operatively communicating with said connecting link;
   a piston slidably disposed in said chamber and operative to reciprocally move therein, a first end of said piston operative to engage said actuator rod; and
   signal generation means operatively associated with said piston for generating a signal after said piston has traveled a predetermined distance in said chamber, said signal generation means comprising a magnetic member producing a magnetic field disposed on said piston and a magnetic field responsive switch member operative to generate a signal in response to the presence of said magnetic field.

2. A system according to claim 1 wherein said magnetic member is a magnet securely affixed to the other end of said piston.

3. A system according to claim 1 wherein said magnetic field responsive switch member is a magnetic reed switch.

4. A system according to claim 3, wherein said magnetic reed switch is electrically connected to a warning signal device disposed in said vehicle.

5. A system according to claim 1, further including a fluid indicating means comprising a float disposed in said reservoir, said float containing magnetic material operative to excite said magnetic field responsive switch member when said fluid reaches a predetermined level in said reservoir.

6. A system according to claim 1, wherein said signal generation means is interposed between said fluid reservoir and said housing of said master cylinder.

7. A brake pedal travel warning system for use in an automotive vehicle, comprising:
   a brake pedal;
   a master cylinder operatively associated with said brake pedal through a connecting link, said master cylinder including:
   a fluid reservoir containing fluid;
   fluid indicating means disposed in said reservoir for generating a signal when said fluid level reaches a predetermined level;
   a housing including an internal bore communicating with said fluid reservoir through a reservoir port, said bore defining a primary chamber and a secondary chamber axially aligned with said primary chamber;
   an actuator rod extending from said housing and operatively communicating with said connecting link;
   a primary piston slidably disposed in said primary chamber and operative to reciprocally move therein, said primary piston including a first end operatively associated with said actuator rod and a second end;
   a secondary piston slidably disposed in said secondary chamber; and
   signal generation means associated with said primary piston and operatively communicating with said fluid level indicating means for generating a signal after said primary piston has traveled a predetermined distance in said primary chamber, said signal generation means comprising a magnetic member producing a magnetic field disposed on said primary piston and a magnetic field responsive switch member operative to generate a signal in response to the presence of said magnetic field.

8. A system according to claim 7 wherein said magnetic member is a magnet securely affixed to the second end of said primary piston.

9. A system according to claim 7 wherein said magnetic field responsive switch member is a magnetic reed switch.

10. A system according to claim 7, wherein said fluid indicating means comprises a float disposed in said reservoir, said float containing magnetic material operative to excite said magnetic field responsive switch member when said fluid reaches a predetermined level in said reservoir.

11. A system according to claim 7, wherein said magnetic reed switch is electrically connected to a warning signal device disposed in said vehicle.

12. A system according to claim 7, wherein said signal generation means is interposed between said fluid reservoir and said housing of said master cylinder.

13. A warning system for use in an automotive brake master cylinder of the type comprising a fluid reservoir containing fluid and operatively connected to at least one master cylinder chamber through a reservoir port, a piston slidably disposed in said at least one chamber, said piston having a first portion operatively associated with an actuator rod and a second portion operative to force fluid through said chamber into at least one exit port, said system comprising:
   a brake pedal operatively connected with said actuator rod so that movement of said brake pedal causes movement of said actuator rod and said piston within said at least one chamber;

signal generation means for generating a signal after said piston has traveled a predetermined distance in said at least one chamber;

signal warning means disposed inside of said vehicle and electrically communicating with said signal generation means for visually warning an operator of said vehicle of excessive brake pedal travel, said signal generation means comprising a magnetic member producing a magnetic field disposed on said piston and a magnetic field responsive switch member operative to generate a signal in response to the presence of said magnetic field.

14. A system as in claim 13, further including fluid indicating means for generating a signal in response to a predetermined fluid level, said fluid indicating means including a magnetic responsive float disposed in said reservoir and operative to excite a magnetic responsive switch located externally of said reservoir and said master cylinder.

15. A system according to claim 13 wherein said magnetic member is a magnet securely affixed to the second portion of said piston.

16. A system according to claim 13 wherein said magnetic field responsive switch member is a magnetic reed switch.

17. A brake pedal travel warning system for use in an automotive vehicle, comprising:

a brake pedal;

a master cylinder operatively associated with said brake pedal through a connecting link, said master cylinder including:

a fluid reservoir containing fluid;

a float disposed in said reservoir, said float containing magnetic material operative to excite a magnetic field responsive switch member when said fluid reaches a predetermined level in said reservoir;

a housing including an internal bore communicating with said fluid reservoir through a reservoir port, said bore defining a primary chamber and a secondary chamber axially aligned with said primary chamber;

an actuator rod extending from said housing and operatively communicating with said connecting link;

a primary piston slidably disposed in said primary chamber and operative to reciprocally move therein, said primary piston including a first end operatively associated with said actuator rod and a second end;

a secondary piston slidably disposed in said secondary chamber; and signal generation means associated with said primary piston and operatively communicating with said fluid level indicating means for generating a signal after said primary piston has traveled a predetermined distance in said primary chamber, said signal generation means comprising a magnetic member disposed on said primary piston and a magnetic field responsive switch member operative to generate a signal in response to the presence of a magnetic field.

* * * * *